(12) United States Patent
Ellegaard

(10) Patent No.: US 11,956,101 B2
(45) Date of Patent: Apr. 9, 2024

(54) SYNCHRONIZATION OF ELEMENTS IN A NETWORK

(71) Applicant: Microchip Technology Incorporated, Chandler, AZ (US)

(72) Inventor: Lars Ellegaard, Copenhagen (DK)

(73) Assignee: Microchip Technology Incorporated, Chandler, AZ (US)

(*) Notice: Subject to any disclaimer, the term of this patent is extended or adjusted under 35 U.S.C. 154(b) by 0 days.

(21) Appl. No.: 17/303,124

(22) Filed: May 20, 2021

(65) Prior Publication Data

US 2021/0385108 A1 Dec. 9, 2021

Related U.S. Application Data

(60) Provisional application No. 62/704,921, filed on Jun. 3, 2020.

(51) Int. Cl.
*H04L 43/00* (2022.01)
*H04J 3/06* (2006.01)
*H04L 12/43* (2006.01)
*H04L 12/46* (2006.01)
*H04L 27/26* (2006.01)
*H04L 43/067* (2022.01)

(52) U.S. Cl.
CPC ........ *H04L 12/4645* (2013.01); *H04J 3/0661* (2013.01); *H04L 12/43* (2013.01); *H04L 27/2657* (2013.01); *H04L 43/067* (2013.01)

(58) Field of Classification Search
CPC . H04L 12/4645; H04L 12/43; H04L 27/2657; H04L 43/067
See application file for complete search history.

(56) References Cited

U.S. PATENT DOCUMENTS

| 6,173,207 | B1* | 1/2001 | Eidson | G05B 19/4185 |
| | | | | 702/187 |
| 6,765,863 | B1* | 7/2004 | Wakimoto | H04L 45/12 |
| | | | | 714/2 |
| 11,018,790 | B2* | 5/2021 | Cotter | H04L 12/2801 |
| 11,108,860 | B1* | 8/2021 | Ellegaard | H04L 43/16 |

(Continued)

FOREIGN PATENT DOCUMENTS

EP 0903655 A2 3/1999

OTHER PUBLICATIONS

IO-Link Handbook—Maxim Integrated, https://www.maximintegrated.com/io-link. Rev 1; Aug. 2017, 42 pages.

(Continued)

*Primary Examiner* — Abdelnabi O Musa
(74) *Attorney, Agent, or Firm* — TraskBritt

(57) ABSTRACT

A network-synchronization device may include a match filter. The match filter may be configured to generate events for synchronizing operation of elements of a network at least partially responsive to timing frames generated at a network switch. The events for synchronizing operation of the elements may include a first event generated at least partially responsive to first information associated with a first element and a second event generated at least partially responsive to second information associated with a second element. Related systems and methods are also disclosed.

26 Claims, 10 Drawing Sheets

(56) References Cited

U.S. PATENT DOCUMENTS

| | | | | |
|---|---|---|---|---|
| 2011/0007718 A1* | 1/2011 | Swarts | ............... | H04L 27/2671 |
| | | | | 370/336 |
| 2012/0275473 A1* | 11/2012 | Yamamoto | ............ | H04J 3/0688 |
| | | | | 370/496 |
| 2016/0294515 A1* | 10/2016 | Wentink | .................. | H04L 5/005 |
| 2018/0053356 A1* | 2/2018 | Bandy | .................... | G06F 17/40 |
| 2019/0386763 A1* | 12/2019 | Rentschler | ............. | H04L 12/28 |
| 2020/0244339 A1* | 7/2020 | Tang | .................... | H04W 48/12 |

OTHER PUBLICATIONS

IEEE: "IEEE Std 1588 (TM)—2008 IEEE Standard for a Precision Clock Synchronization Protocol for Networked Measurement and Control Systems IEEE Instrumentation and Measure Society", Jul. 24, 2008, retrieved from the Internet: URL: https://ieeexplore.ieee.org, 1 page.
International Search Report from International Application No. PCT/US2021/070588, dated Sep. 1, 2021, 5 pages.
International Written Opinion from International Application No. PCT/US2021/070588, dated Sep. 1, 2021, 11 pages.
Li et al., "Semiconductor factory and equipment clock synchronization for e-manufacturing NIST IR 7184", National Institute of Standards and Technology (NIST), Dec. 31, 2004, pp. 1-33.

* cited by examiner

SYNCHRONIZATION OF ELEMENTS IN A NETWORK

CROSS-REFERENCE TO RELATED APPLICATION

This application claims the benefit of the priority date of U.S. Provisional Patent Application No. 62/704,921, filed Jun. 3, 2020, and titled "SYNCHRONIZATION OF EDGE ELEMENTS," the disclosure of which is incorporated herein in its entirety by this reference.

TECHNICAL FIELD

The present disclosure relates, generally, to communication networks, and more specifically to synchronizing elements in a network. Yet more specifically, various examples of the disclosure relate to synchronizing elements, including, as non-limiting examples, sensors and actuators, in a communication network.

BACKGROUND

Various interface standards for connecting computers and external peripherals may be used to provide connectivity at high speeds. A widely used, flexible networking standard for connecting computers (e.g., in Local Area Networks (LANs) and Wide Area Networks (WANs)) is the Ethernet protocol. Ethernet communication generally refers to point-to-point communication within a network of multiple end points. Ethernet protocols generally makes efficient use of shared resources, are easy to maintain and reconfigure, and are compatible across many systems.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

DETAILED DESCRIPTION

Figure 1:
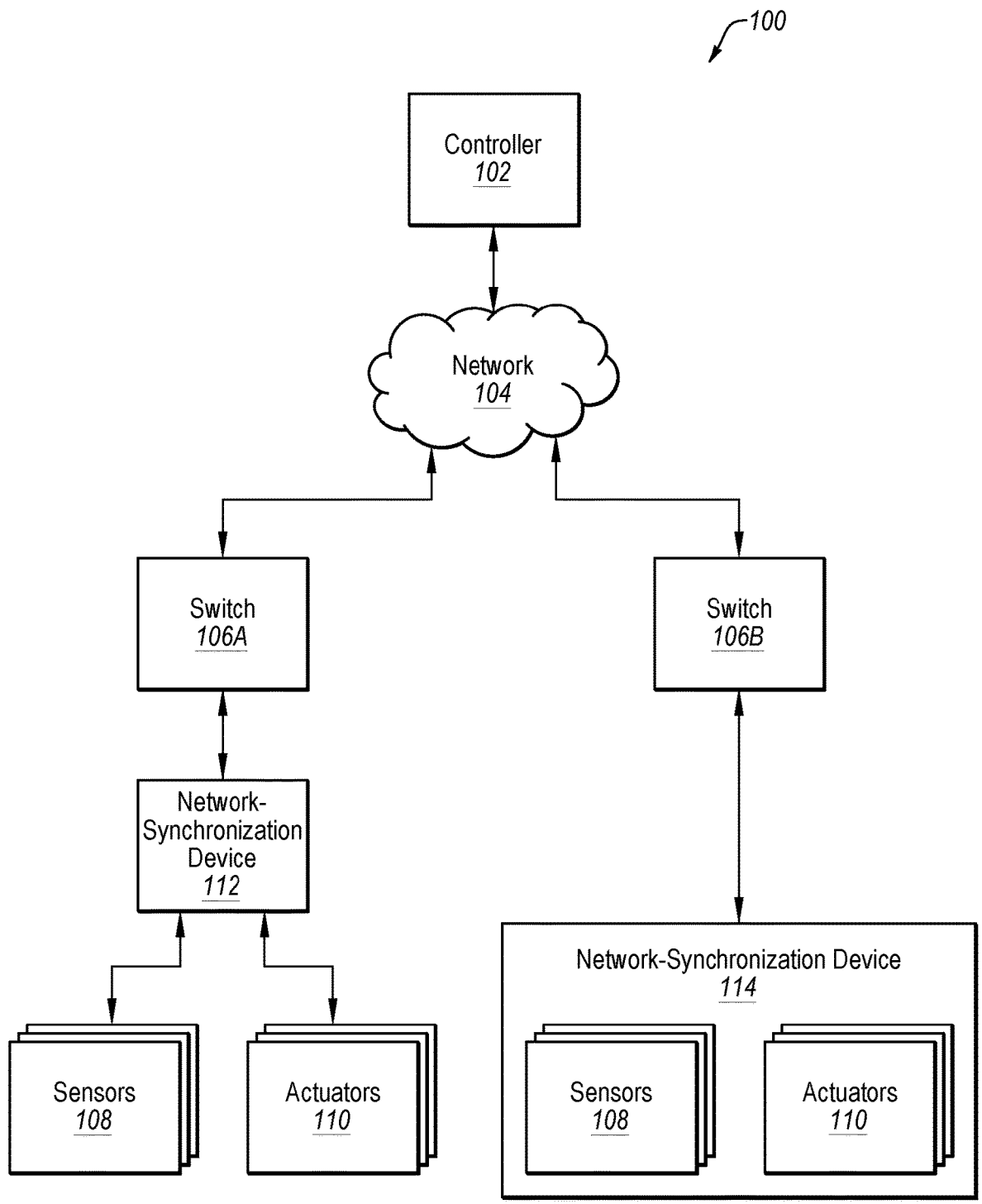
FIG. 1 is a functional block diagram illustrating an example environment in which one or more examples of the present disclosure may be configured to operate.

In the following detailed description, reference is made to the accompanying drawings, which form a part hereof, and in which are shown, by way of illustration, specific examples of examples in which the present disclosure may be practiced. These examples are described in sufficient detail to enable a person of ordinary skill in the art to practice the present disclosure. However, other examples enabled herein may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. In some instances similar structures or components in the various drawings may retain the same or similar numbering for the convenience of the reader; however, the similarity in numbering does not necessarily mean that the structures or components are identical in size, composition, configuration, or any other property.

Elements described herein may include multiple instances of the same element. These elements may be generically indicated by a numerical designator (e.g., 384) and specifically indicated by the numerical indicator followed by an alphabetic designator (e.g., 384A).

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawings could be arranged and designed in a wide variety of different configurations. Thus, the following description of various examples is not intended to limit the scope of the present disclosure, but is merely representative of various examples. While the various aspects of the examples may be presented in the drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be shown in block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the examples disclosed herein may be implemented or performed with a processor such as a general purpose processor, a special purpose processor, a digital signal processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform one or more of the features or functions of examples described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer is configured to execute computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, a subprogram, other structure, or combinations thereof. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Automation/control systems (e.g., industrial control systems) are employed for controlling operation of, for example, processes or machines, and are typically adaptable to different control applications through configuration and interconnection of multiple control system components or devices (e.g., control modules, input/output (I/O) modules, I/O devices, motor drives, without limitation). Some control systems may include a processor running or executing a control program to interact with an I/O system (e.g., typically one or more I/O modules or devices) to receive system information in the form of analog or digital inputs from sensors and to provide outputs (analog or digital) to one or more actuators. Control systems may be interconnected with management information and other systems in a manufacturing facility, and may be operatively connected to any number of communications networks to facilitate various management functions (e.g., inventory control, accounting, and manufacturing control, without limitation) in addition to process/machine control functionality.

A desire to integrate business and control network structures to interconnect control systems with general purpose systems, along with the evolution and development of Ethernet (e.g., in switch mode with full duplex capability), has allowed for Ethernet networks (e.g., such as Ethernet/Internet Protocol networks that allow for direct connection of devices to an Ethernet network) to be widely used in various applications (e.g., industrial applications).

Time-Sensitive Networking (TSN) is a set of standards under development by the Time-Sensitive Networking task group of the Institute of Electrical and Electronics Engineers (IEEE) 802.1 working group. IEEE 802.1CB ("Frame Replication and Elimination for Reliability") and International Electrotechnical Commission (IEC) 62439-3 (High-availability Seamless Redundancy (HSR) and Parallel Redundancy Protocol (PRP)) standards introduce redundancy and failure detection, which is important for functional safety, as well as frame replication and elimination. TSN standards aim to improve the robustness, reliability, redundancy, and failure detection ability of Ethernet so that Ethernet may be used for real-time control and for safety-critical applications.

Examples of the present disclosure may provide for synchronization of elements in a network. In one example, those elements may be edge elements. Examples of the present disclosure may provide for synchronization between elements of a network e.g., a control system including sensors or actuators. Synchronization between elements of a network may be important to provide for accurately coordinated operations of the elements. For example, a first operation of a first actuator (e.g., moving a work product from a first location to a second location) may need to be accurately coordinated in time with a second operation of a second actuator (e.g., applying a tool to the work product at the second location), where the first actuator and second actuator are examples of elements of the network.

In various examples, a switch may be configured to generate timing frames at regular intervals. In various examples, the switch may be synchronized to a synchronization master ("sync master") that may be connected to the network. The timing frames may include an indication that the timing frames are timing frames. For example, a timing frame may include one or more bits in a header or a payload of the timing frame that may be interpreted as an indication that the timing frame is a timing frame. A timing-frame definition may define the indication that a frame (e.g., an Ethernet frame) is a timing frame. Additionally, in various examples, the timing frames may include information indicative of an element or an indication of an operation to be performed or reported by an element. The timing-frame definition may define the information indicative of the element.

In various examples, a network-synchronization device may be configured to receive frames (e.g., Ethernet frames) (e.g., at regular intervals) and determine whether a received frame is a timing frame. The network-synchronization device may be configured to determine that the received frame is a timing frame based on a comparison between the received frame and the timing-frame definition. The network-synchronization device may further be configured to generate an event in response to determining that a received frame is a timing frame. Stated another way, the network-synchronization device may be configured to generate an event in response to receiving a timing frame. In the present disclosure, the term "event" may refer to a signal that an element may be configured to recognize or respond to.

In various examples, the network-synchronization device may be communicatively coupled to one or more elements of the network, e.g., one or more sensors or one or more actuators. In various examples, the network-synchronization device may include one or more elements of the network (e.g., one or more sensors or actuators). In either case, the event generated by the network-synchronization device may cause the one or more elements of the network to operate. For example, in various examples, a sensor may sense or report an indication of a sensed property (also referred to herein as "take a reading") in response to the event. For example, by providing the event to the sensor the network-synchronization device may poll the sensor. As another example, an actuator may operate (e.g., move or cause movement) in response to the event. In various embodiments the event may be, or may include, operational instructions e.g., indicative of how or when an element is to operate.

Additionally or alternatively, in various examples, the network-synchronization device may be configured to provide a data frame indicative of the sensed property in response to determining that a received frame (e.g., an Ethernet frame) is a timing frame. For example, a sensor may sense a property and provide an indication of the sensed property (e.g., a reading) to the network-synchronization device at a first time. The first time may or may not be in response to an event. The network-synchronization device may store the indication of the sensed property until the network-synchronization device determines that a received frame is a timing frame, e.g., at a second time. In response to determining that the received frame is a timing frame, the network-synchronization device may be configured to provide a data frame indicative of the sensed property to another device on the network, e.g., via the switch which provided the timing frame. The data frame may have been generated by the network-synchronization device when the indication of the sensed property was received by the network-synchronization device, when it was determined that the received frame was a timing frame, or at some other time.

Additionally or alternatively, in various examples, the network-synchronization device may be configured to provide a control signal to an actuator to control operation of the actuator. The control signal may be based on a data frame received by the network-synchronization device at a first time. The network-synchronization device may be configured to store the control signal until the network-synchronization device determines that a received frame (e.g., an Ethernet frame) is a timing frame, e.g., at a second time. In response to determining that a received frame is a timing frame, the network-synchronization device may be configured to provide the control signal to the actuator e.g., to control the timing of the operation of the actuator. Alternatively, the network-synchronization device may be configured to provide the control signal to the actuator when the data frame is received (e.g., at the first time) and to generate an event in response to receiving a timing frame (e.g., at the second time). In such cases, the actuator may be configured to operate according to the control signal when the actuator receives the event.

By one or more of: polling one or more sensors, providing an indication of a sensed property, or controlling operation of an actuator in response to determining that a received frame is a timing frame (one or more of which may be the result of generating an event), the network-synchronization device may be able to synchronize elements, or operation of elements, in a network.

Additionally, in various examples, timing frames may include information indicative of an element or an indication of an operation of an element to be performed or reported. In these or other examples, a network-synchronization device may be configured to receive a timing frame and determine which element is indicated by the timing frame. The network-synchronization device may be configured to determine which element is indicated by the timing frame based on a comparison between the received timing frame and the timing-frame definition. The network-synchronization device may further be configured to generate an event for the indicated element in response to determining the indicated element. Stated another way, the network-synchronization device may be configured to generate an event for an element in response to receiving a timing frame indicative of the element.

FIG. 1 is a functional block diagram illustrating an example environment 100 in which one or more examples of the present disclosure may be configured to operate. Environment 100 includes a controller 102, a network 104, a switch 106A, a switch 106B, sensors 108, actuators 110, a first network-synchronization device 112, and a second network-synchronization device 114. Sensor 108 and actuators 110 are non-limiting examples of elements.

Controller 102 may be configured, generally, to send control signals to one or more actuators (e.g., actuators 110) and receive inputs from one or more sensors (e.g., sensors 108). In various examples, controller 102 may be a programmable logic controller (PLC). Controller 102 may be configured to control operations of a network, or system, of elements (including e.g., sensors 108 or actuators 110, without limitation) to perform coordinated operations (e.g., manufacturing or processing operations, without limitation).

Controller 102 may be communicatively connected to sensors 106 and actuators 110 via network 104. Network 104 may be, or include, a communication network through which controller 102 can send control signals to actuators 110 and receive inputs from sensors 108. Network 104 may include one or more switches, bridges, or network cables and the like. Network 104 may be configured to function according to Ethernet protocols, in other words, network 104 may be an Ethernet network.

Switch 106A and switch 106B may be configured, generally, to receive communications (e.g., Ethernet frames, without limitation) over network 104 that are addressed to one or more of sensors 108 or actuators 110 to which they are communicatively connected, and forward the received communications to their respective destinations.

In various examples, switch 106A and switch 106B may be configured to generate timing frames at regular intervals and to provide the timing frames to first network-synchronization device 112 and second network-synchronization device 114 respectively. Additional details regarding operations of switch 106A and switch 106B are described below with regard to switch 106 of FIG. 2.

Sensors 108 may be configured, generally, to sense one or more properties. Non-limiting examples of sensors 108 include: acoustic sensors, angular sensors, chemical sensors, electric sensors, magnetic sensors, radiation sensors, fluid sensors, position sensors, displacement sensors, speed sensors, optical sensors, pressure sensors, force sensors, weight sensors, thermal sensors, and combinations thereof.

Each of sensors 108 may include an interface for receiving inputs and providing outputs. Sensors 108 may be configured to receive events at their respective interfaces. Sensors 108 may be configured to provide indications of sensed properties (e.g., a reading, without limitation) at their respective interfaces.

In various examples, each sensor 108 may be configured to sense a property or to report a sensed property in response to an event, such as receipt of a polling message, without limitation. Additionally or alternatively, sensors 108 may be configured to report a sensed property asynchronously, without waiting for an external stimulus such as an event. As a non-limiting example, a sensor 108 may be configured to sense a property and provide indications of the sensed property continuously or at pre-specified intervals defined at the sensor 108.

Actuators 110 may be configured, generally, to directly or indirectly move, electrically connect, or control a mechanism or system in response to a control signal. Actuators 110 may optionally include sensors configured to measure the movement e.g., for a control loop, without limitation. Non-limiting examples of actuators 110 includes: hydraulic actuators, pneumatic actuators, electric actuators, thermal actuators, magnetic actuators, motors or mechanical actuators.

Each of actuators 110 may include an interface for receiving inputs. Actuators 110 may be configured to receive an event at their respective interfaces. Actuators 110 may be configured to operate in response to receiving an event (e.g., when the event is received). Additionally or alternatively, actuators 110 may be configured to receive a control signal that may govern operation of actuators 110 (e.g., the control signal may be indicative of a degree of operation e.g., how much to move, how fast to move, or how much force to apply). In various examples, the event may include the control signal. In other examples the event and the control signal may be separate and the actuators 110 may be configured to operate according to the control signal in response to receiving the event (e.g., when the event is received, without limitation). Additionally, in various examples, actuators 110 may provide an indication that a given control action has completed at their respective interfaces.

In various examples, first network-synchronization device 112 may be configured to synchronize operation of one or more elements of environment 100, including synchronize sensors 108 or actuators 110 that are connected to first network-synchronization device 112. In various examples, first network-synchronization device 112 may be configured to synchronize the sensors 108 or actuators 110 to which it is connected with other sensors 108 or actuators 110 to which it is not directly connected. For example, environment 100 may include multiple network-synchronization devices (not illustrated) each connected to a switch, each connected to one or more sensors or actuators (not illustrated), and all communicatively coupled to network 104. The multiple network-synchronization devices may be configured to synchronize all of the sensors or actuators to which they are collectively connected. In these or other examples, first network-synchronization device 112 may be configured to synchronize sensors 108 or actuators 110 to which it is connected with another element on network 104 (e.g., a sync master). Additional details regarding operations of first network-synchronization device 112 are described below with regard to FIG. 3.

In various examples, second network-synchronization device 114 may be configured to provide for synchronization between one or more sensors 108 or one or more actuators 110 that are connected to second network-synchronization device 114. Second network-synchronization device 114 may include one or more sensors 108 or actuators 110. In various examples, similar to what was described above with regard to first network-synchronization device 112, second network-synchronization device 114 may be configured to synchronize the sensors 108 or actuators 110 which it includes with other sensors 108 or actuators 110. Additional details regarding operations of second network-synchronization device 114 are described below with regard to FIG. 4.

Figure 2:
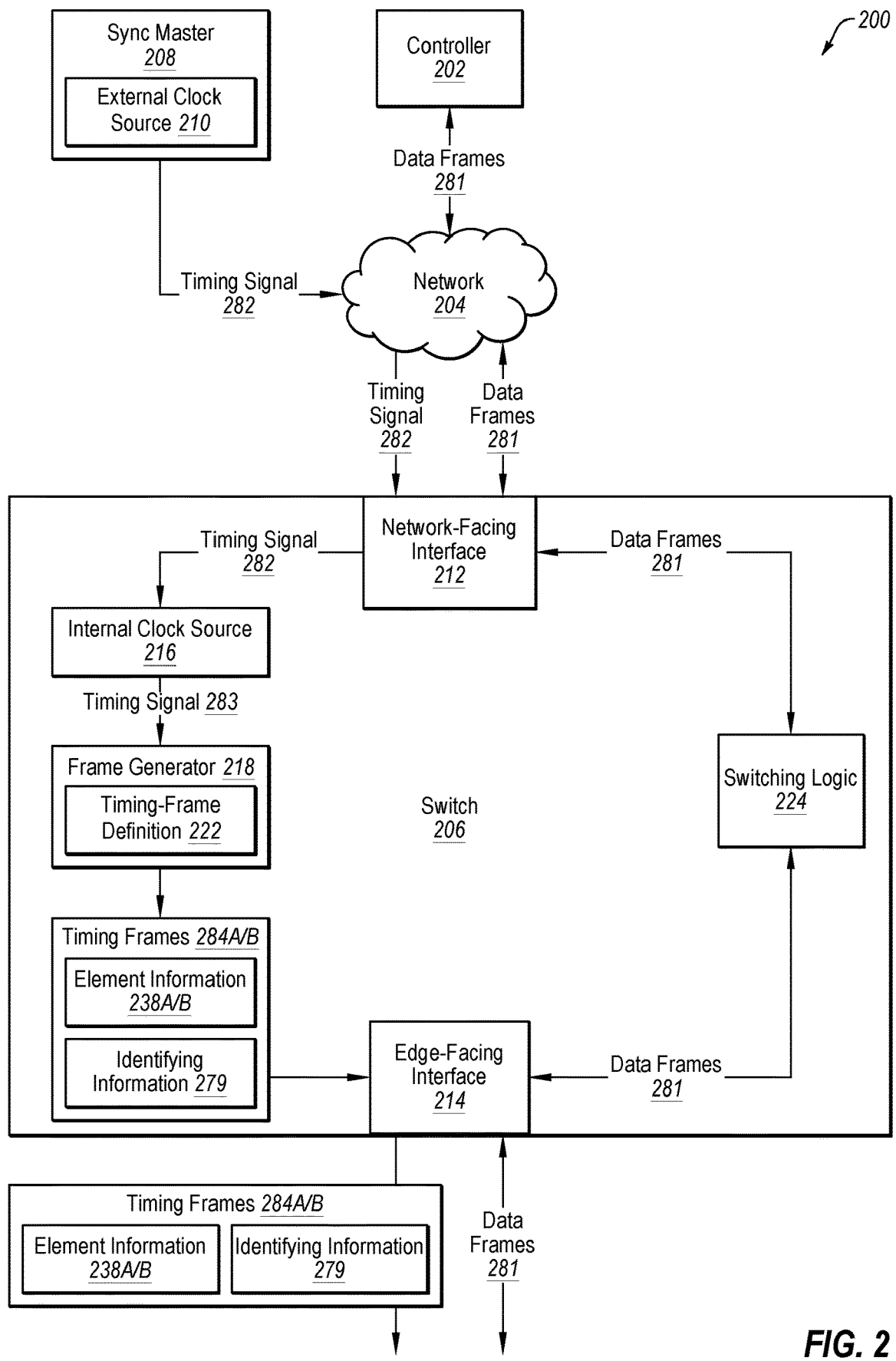
FIG. 2 is a functional block diagram illustrating an example system including a switch configured to operate according to one or more examples of the present disclosure.

FIG. 2 is a functional block diagram illustrating an example system 200 including a switch 206 configured to operate according to one or more examples of the present disclosure. Switch 206 may be configured to generate timing frames 284 at regular intervals to allow for synchronization of sensors or actuators (e.g., sensors 108 or actuators 110 of FIG. 1) by a network-synchronization device (e.g., first network synchronization device 112 or second network synchronization device 114 of FIG. 1). System 200 includes a controller 202, a network 204, switch 206, and a synchronization master 208, also called a sync master 208.

Controller 202 of system 200 may be the same as, or substantially similar to, controller 102 as described above with regard to environment 100 of FIG. 1. Additionally, FIG. 2 illustrates communication between controller 202 and sensors or actuators (not shown) as data frames 281. Data frames 281 may be termed "frames" because the communication between controller 202 and the sensors or actuators may be included in a format suitable for communication in network 204, e.g., Ethernet frames.

Network 204 of system 200 may be the same as, or substantially similar to, network 104 as described above with regard to environment 100 of FIG. 1. Additionally, FIG. 2 illustrates communication between controller 202, switch 206, and sync master 208 as data frames 281 and as a timing signal 282, respectively. Network 204 may be configured to provide for communication between controller 202, switch 206, and sync master 208.

Sync master 208 may be configured to provide the timing signal 282 to network 204 or to one or more elements connected to network 204. Sync master 208 may include an external clock source 210. External clock source 210 is referred to as "external" because, from the perspective of switch 206, external clock source 210 is external. One or more elements communicatively coupled to network 204 may be configured to be synchronized according to timing signal 282 of sync master 208. Timing signal 282 provided by sync master 208 may be according to protocols including, as non-limiting examples: IEEE 1588, IEEE 802.1AS, and Internet Engineering Task Force (IETF) Request for Comment (RFC) 5905 Network Time Protocol.

Switch 206 of system 200 of FIG. 2, may be an example of switch 106A or switch 106B, as described above with regard to environment 100 of FIG. 1. Switch 206 includes a frame generator 218, an internal clock source 216, switching logic 224, a network-facing interface 212, and an edge-facing interface 214.

Switch 206 may be configured to forward frames according to an Ethernet protocol. For example, switch 206 may be configured to provide communications to and from network 204 (or to and from elements connected to network 204)

from and to elements (e.g., sensors or actuators) connected to switch 206 (or to elements connected to switch 206 through an intermediate device e.g., a network-synchronization device, without limitation).

Switch 206 may be configured to generate timing frames 284 (e.g., Ethernet frames configured as timing frames 284) and provide timing frames 284 to one or more elements (e.g., sensors or actuators). For example, frame generator 218 may be configured to generate timing frames 284 according to a timing-frame definition 222. Frame generator 218 may be configured to generate timing frames 284 to include identifying information 279, e.g., an indication that timing frames 284 are timing frames. For example, a timing frame 284 may be an Ethernet frame and may include one or more bits in its header or payload that are configured to be interpreted as an indication that timing frame 284 is a timing frame. As an example, one or more of a source MAC address, a virtual local area network (VLAN) tag (e.g., as described in the IEEE standard 802.1Q), an EtherType value (e.g., a field in an Ethernet frame used to indicate a protocol encapsulated in the payload of an Ethernet frame), or parts of the payload of timing frame 284 may include one or more bits configured to be interpreted as the indication that timing frame 284 is a timing frame.

Figure 8:
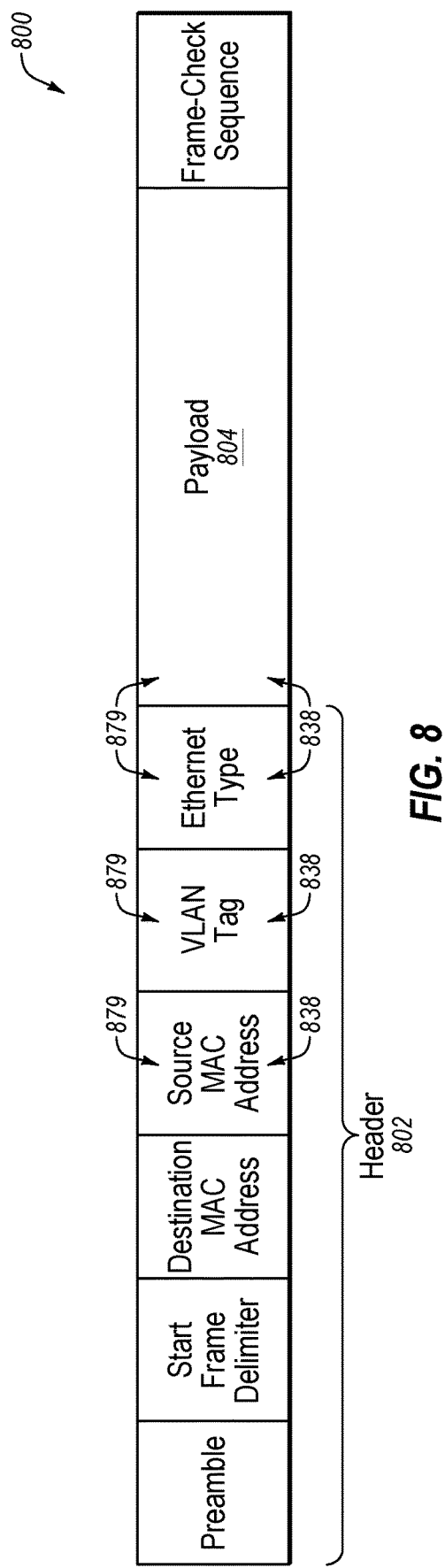
FIG. 8 is a diagram illustrating an example Ethernet frame, according to one more examples of the present disclosure.

For example, FIG. 8 illustrates an Ethernet frame 800, including a header 802 including a source MAC address, a VLAN tag, and an EtherType and a payload 804 (not to scale). One or both of identifying information 879 and element information 838 may be included in one or more of the source MAC address, the VLAN tag, the EtherType, (i.e., in the header 802), and the payload 804. In various embodiments, an Ethernet frame 800 may include element information for one or more elements. Timing-frame definition 222 may include an indication of which bits are to be interpreted as the indication that timing frame 284 is a timing frame.

Additionally, in various examples, frame generator 218 may be configured to generate timing frames 284 that include element information 238 identifying an element (e.g., a sensor or actuator) for which the timing frame 284 is intended. For example, frame generator 218 may generate a first timing frame 284A including first element information 238A intended for a first element. Frame generator 218 may also generate a second timing frame 284B including second element information 238B intended for a second element. The element information 238 may be included in the header or payload of timing frame 284, as described in relation to FIG. 8. Frame generator 218 may be configured to generate timing frames 284 for the elements according to an association between the information and the elements as found in timing-frame definition 222. For example, timing-frame definition 222 may include a correlation between each of two or more elements and information includable in timing frames 284 to be indicative of each of the two or more elements. In various examples, each timing frame 284 may include one indication of one element for which the timing frame 284 is intended.

In various examples, switch 206 may be configured to generate and provide timing frames 284 at regular intervals (e.g., every 10 milliseconds or every 100 milliseconds without limitation). In various examples, switch 206 may be configured to generate or provide timing frames 284 at regular intervals based on timing of internal clock source 216 or external clock source 210. For example, switch 206 may include internal clock source 216 which may be configured to receive timing signals 282 generated by sync master 208 and synchronize a timing of internal clock source 216 with external clock source 210 (e.g., according to any of the protocols listed above) responsive the received timing signals 282. Additionally, internal clock source 216 may be configured to provide a timing signal 283 to frame generator 218, and frame generator 218 may be configured to generate timing frames 284 based on timing signal 283. Thus, switch 206 may be configured to synchronize the generation of timing frames 284 with other elements on the network (e.g., other elements synchronized to sync master 208) via synchronization of internal clock source 216.

Figure 3:
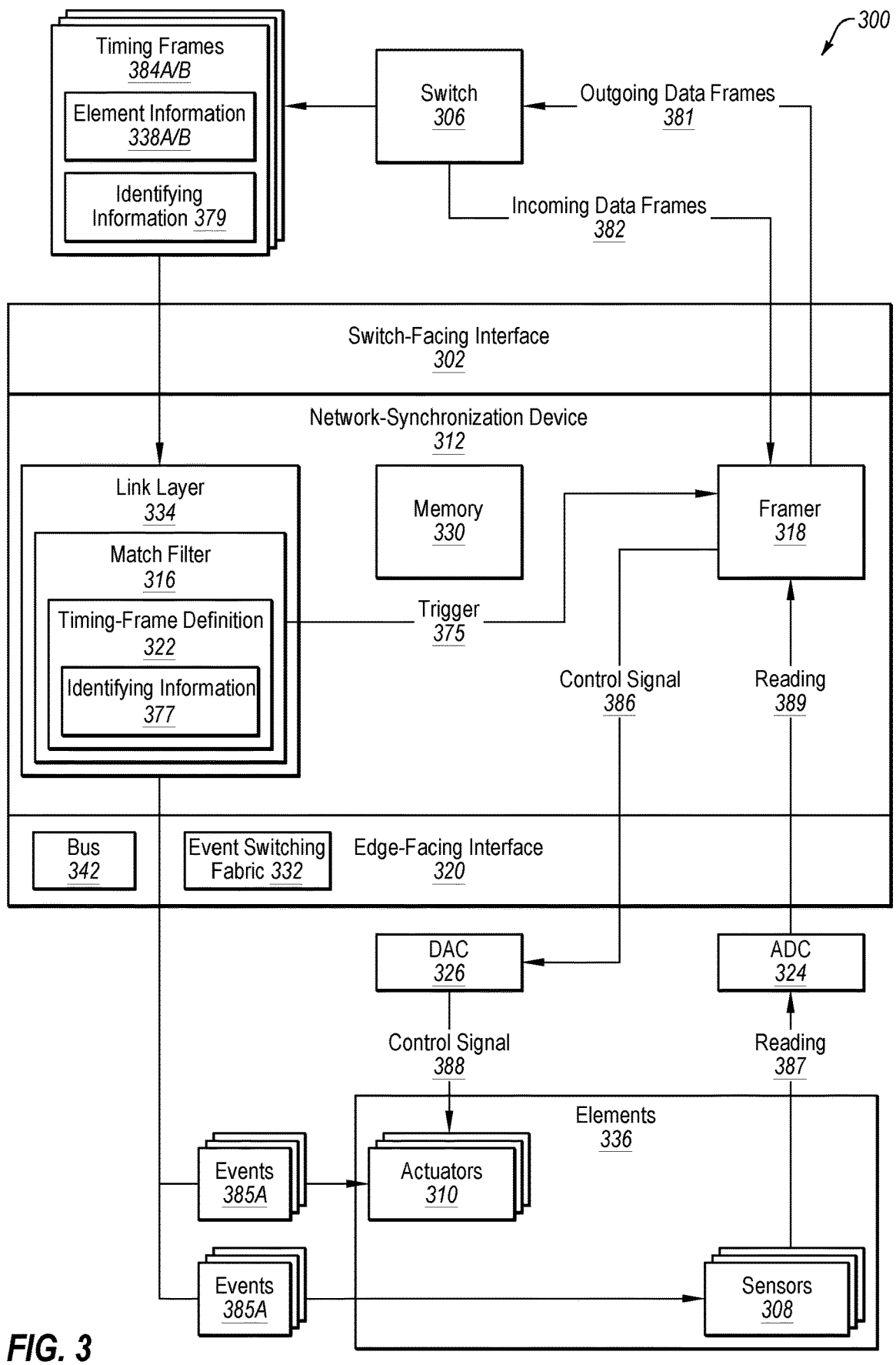
FIG. 3 is a functional block diagram illustrating an example system including an example network-synchronization device according to one or more examples of the present disclosure.

FIG. 3 is a functional block diagram illustrating an example network 300 including a network-synchronization device 312 according to one or more examples of the present disclosure. In particular, FIG. 3 illustrates network-synchronization device 312 communicatively coupled between switch 306 and one or more elements 336, e.g., sensors 308 or actuators 310, which in this example may be considered edge elements. Network-synchronization device 312 includes a switch-facing interface 302, a match filter 316 at a link layer 334, a framer 318, an edge-facing interface 320, and a memory 330.

Network-synchronization device 312 may be configured to provide for synchronization between sensors 308 or actuators 310 and one or more other elements of a network (e.g., of the environment 100 of FIG. 1). For example, network-synchronization device 312 may be configured to receive timing frames 384, generate events 385 in response to timing frames 384, and provide the generated events 385 to one or more of sensors 308 or actuators 310. Additionally, network-synchronization device 312 may be configured to provide outgoing data frames 381 in response to validating timing frames 384. The reception of timing frames 384 and providing of events 385 or outgoing data frames 381 may allow for synchronization between sensors 308 or actuators 310 and the other elements (e.g., of a larger system, or network, e.g., of environment 100 of FIG. 1).

Switch 306 may be an example of switch 206 of FIG. 2. Switch 306 may be configured to provide at least incoming data frames 382 (e.g., from controller 202 of FIG. 2 via network 204 of FIG. 2) and timing frames 384 (e.g., Ethernet frames configured as timing frames) to network-synchronization device 312. Switch 306 may be configured to receive outgoing data frames 381 from network-synchronization device 312 and may be configured to provide outgoing data frames 381 to a controller, e.g., controller 202 of FIG. 2, via network 204 of FIG. 2. Additionally, switch 306 may be configured to provide timing frames 384 at regular intervals to network-synchronization device 312. Additionally, in various examples, switch 306 may be configured to provide timing frames 384 including element information 338 indicative of a specific element (e.g., a sensor or actuator). For example, a first timing frame 384A may include first element information 338A and a second timing frame 384B may include second element information 338B.

Sensors 308 may be an example of sensors 108 of FIG. 1. Actuators 310 may be an example of actuators 110 of FIG. 1.

Switch-facing interface 302 may be an interface of network-synchronization device 312, e.g., an Ethernet port that may be configured to send and receive signals. Switch-facing interface may include a switching fabric (not illustrated) or a classifier (not illustrated). Switch-facing interface 302 may be configured to receive incoming frames (e.g., Ethernet frames), including incoming data frames 382 and timing frames 384 (e.g., from switch 306) and to provide incoming data frames 382 to framer 318 and to provide timing frames 384 to match filter 316. Switch-facing interface 302 may be configured to receive outgoing data frames 381 (e.g., from framer 318) and to provide outgoing data frames 381 to switch 306.

Match filter 316 may be configured to validate timing frames 384. For example, match filter 316 may be configured to receive timing frames 384 from switch-facing interface 302 and to determine whether each of timing frames 384 is a valid timing frame. For example, match filter 316 may include a timing-frame definition 322. Match filter 316 may be configured to compare timing frames 384 to timing-frame definition 322 to determine whether each of timing frames 384 is a valid timing frame. Match filter 316 may include any suitable logic (e.g., a digital filter, without limitation) configured to determine whether timing frames 384 are valid timing frames. The comparison of timing frames 384 with timing-frame definition 322 may include comparing identifying information 379, e.g., in a header of timing frames 384 with identifying information 377 of timing-frame definition 322. For example, identifying information 379, as found in one or more of: a source media access control (MAC) address, a VLAN tag (e.g., according to IEEE 802.1Q, without limitation), or an EtherType tag of timing frames 384 may be compared with identifying information 377 of timing-frame definition 322. Additionally or alternatively, identifying information 379, as found in one or more bits in a payload of timing frames 384 may be compared with identifying information 377 of timing frame definition 322 to determine whether timing frames 384 are valid timing frames. As illustrated, in various non-limiting examples, match filter 316 may operate at link layer 334 of network-synchronization device 312.

Additionally, in various examples, in like manner, match filter 316 may be configured to determine an element indicated by a timing frame 384. For example, match filter 316 may be configured to compare element information 338 (e.g., bits in a header or payload) in timing frame 384 with timing-frame definition 322 to determine which element is indicated by timing frame 384. For example, a first timing frame 384A may include first element information 338A which may indicate a first element and a second timing frame 384B may include second element information 338B which may indicate a second element. The timing frame definition 322 may include a relationship between first element information 338A and the first element and a relationship between second element information 338B and the second element.

Match filter 316 may be configured to generate events 385. In particular, in response to determining that a timing frame 384 is a valid timing frame, match filter 316 may be configured to generate an event 385. Network-synchronization device 312 may be configured to provide event 385 to one or more sensors 308 or actuators 310. Sensors 308 or actuators 310 may be configured to operate in response to event 385. For example, in response to event 385, sensors 308 may be configured to sense a property or report the sensed property and actuators 310 may be configured to operate (e.g., cause movement).

Additionally or alternatively, in various examples, network-synchronization device 312 may be configured to provide outgoing data frame 381 in response to determining that a timing frame 384 is a valid timing frame. For example, network-synchronization device 312 may receive an indication of a sensed property from a sensor at a first time. Network-synchronization device 312 may be configured to store the indication of the sensed property at memory 330. Match filter 316 may be configured to receive and validate a timing frame 384 at a second time. Match filter 316 may be configured to provide framer 318 with a trigger 375 indicating that the timing frame 384 has been validated, at which time, outgoing data frame 381 may be provided to switch 306 at switch-facing interface 302. Memory 330 may be any suitable form of memory, including, as non-limiting examples: volatile data storage (e.g., random-access memory (RAM)) and non-volatile data storage (e.g., Flash memory, a hard disc drive, a solid state drive, erasable programmable read-only memory (EPROM)).

Additionally or alternatively, in various examples, match filter 316 may be configured to generate an event 385 for a specific element, e.g., in response to a received timing frame 384 indicating the element. For example, if match filter 316 determines that a first received timing frame 384A includes first element information 338A indicative of a particular one of actuators 310, match filter 316 may be configured to generate an event 385A for the particular one of actuators 310. And, if match filter 316 determines that a second received timing frame 384B includes second element information 338B indicative of a particular one of sensors 308, match filter 316 may be configured to generate an event 385B for the particular one of sensors 308. Generating an event 385 for a particular element may include, as non-limiting examples, providing the event 385 to the specific element.

Network-synchronization device 312 may be configured to communicate with sensors 308 or actuators 310 through edge-facing interface 320. Edge-facing interface 320 may include one or more buses, serial communication ports, or other suitable ports for communicative coupling between network-synchronization device 312 and sensors 308 and actuators 310. Edge-facing interface 320 may include an event-switching fabric 332 and may be configured to provide specific events 385 to specific elements 336, e.g., through a direct connection or through an addressed signal at a bus 342.

Between sensors 308 and edge-facing interface 320 there may be an analog-to-digital converter (ADC) 324. ADC 324 may be configured to convert analog indications of sensed properties, (e.g., readings 387) from sensors 308 into digital signals suitable for communication to network-synchronization device 312 via edge-facing interface 320. In various examples, ADC 324 may be part of sensors 308. In other examples, ADC 324 may be part of edge-facing interface 320. The output of ADC 324 is transmitted through edge-facing interface 320 to framer 318, which functions to insert the output of ADC 324, i.e., the converted indications of sensed properties (e.g., digitized readings 389), into a data frame for transmission.

Between actuators 310 and edge-facing interface 320 there may be a digital-to-analog converter (DAC) 326. DAC 326 may be configured to convert digital outputs from edge-facing interface 320 into analog signals suitable for operation by actuators 310. For example, DAC 326 may convert a digital value of a control signal 386 (e.g., data of an incoming data frame received from controller 202 of FIG. 2 and intended for actuator 310) into an analog signal 388 that may cause actuators 310 to operate according to the control signal. In various examples, DAC 326 may be a part of actuators 310. In other examples, DAC 326 may be part of edge-facing interface 320.

Framer 318 may be configured to receive converted indications of sensed properties (e.g., digitized readings 389) from sensors 308 (e.g., through ADC 324 and edge-facing interface 320) and to format the converted indications of sensed properties for communication at switch-facing interface 302. For example, framer 318 may be configured to receive an indication of a sensed property (e.g., a digitized reading 389 from a sensor 308) and frame data indicative of the sensed property into an outgoing data frame (e.g., an Ethernet frame). Framer 318 may provide the outgoing data frame 381 to switch-facing interface 302.

Additionally or alternatively, framer 318 may be configured to receive incoming data frames 382 from switch-facing interface 302 (which may have been generated by a controller e.g., controller 202 of FIG. 2), and provide control signals 386 to actuators 310 based on the incoming data frames 382. In various examples, the control signals 386 may include one or more of an indication of an operation to be performed by the actuator or an indication of a degree to which to perform the operation. In various examples, the control signals 386 may be configured to be used by actuators 310 directly, e.g., either after digital-to-analog conversion, or without digital-to-analog conversion, in either case without additional processing.

In various examples, control signals 386, e.g., generated responsive to incoming data frames 382 may be delayed e.g., to correspond to generation of an event 385 (e.g., in response to reception or validation of a timing frame 384). For example, framer 318 may receive an incoming data frame 382 at a first time. Framer 318 may generate a control signal 386 responsive to the incoming data frame at the first time. The control signal 386 may be stored at memory 330. Match filter 316 may receive and validate timing frame 384 at a second time. At the second time, match filter 318 may provide framer 318 with trigger 375 and in response, framer 318 may provide actuator 310 with the control signal 386. In various examples, framer 318 or edge-facing interface 320 does not delay control signals 386; instead actuators 310 may be configured to delay action and only act based on the control signal 386 responsive to event 385.

Figure 4:
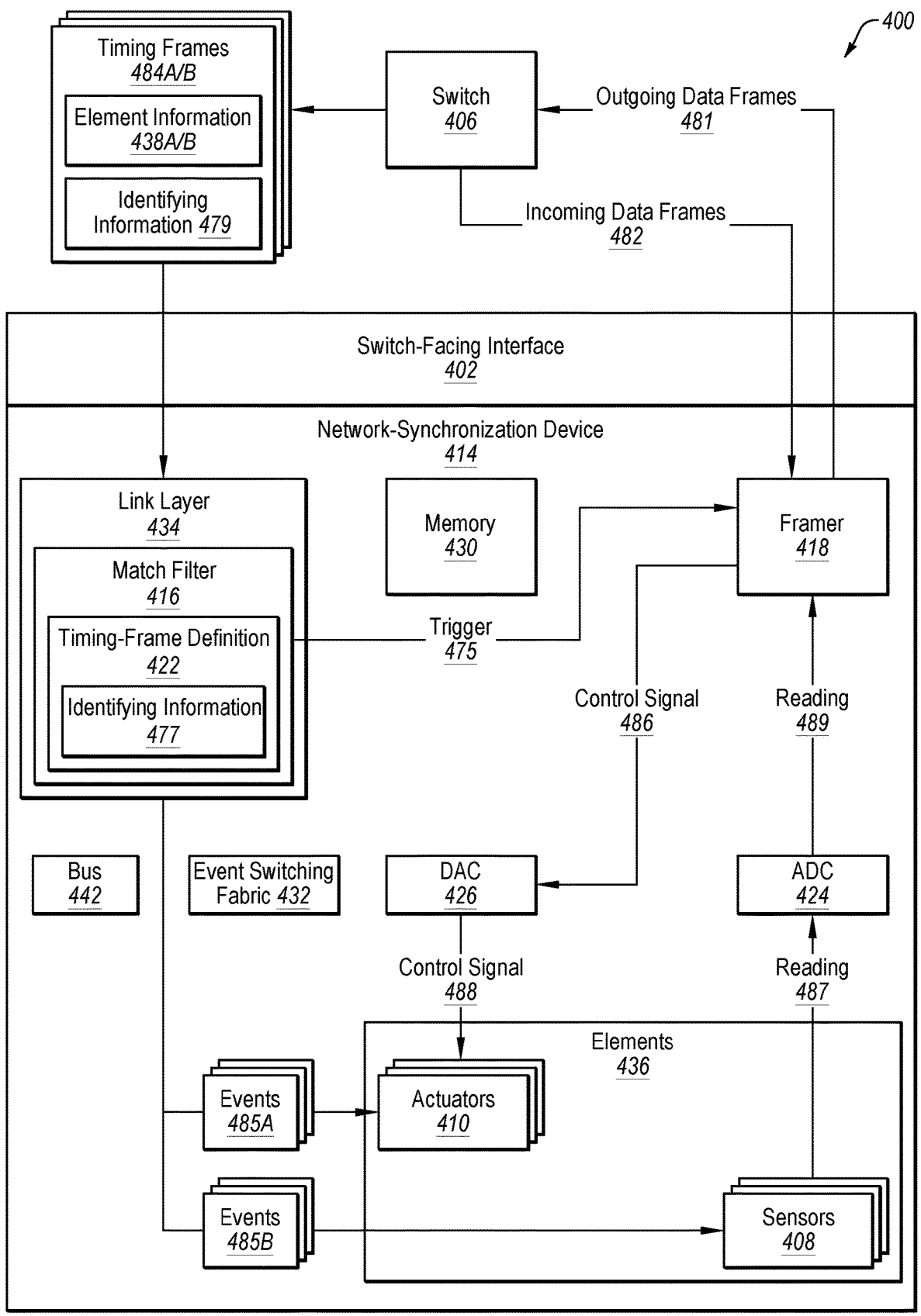
FIG. 4 is a functional block diagram illustrating an example system including another example network-synchronization device according to one or more examples of the present disclosure.

FIG. 4 is a functional block diagram illustrating an example system 400 including a network-synchronization device 414 according to one or more examples of the present disclosure. In particular, FIG. 4 illustrates network-synchronization device 414 communicatively coupled to a switch 406 and including sensors 408 or actuators 410, or alternately, both sensors 408 and actuators 410. Network-synchronization device 414 includes a switch-facing interface 402, a match filter 416 at a link layer 434, a framer 418, a memory 430, and one or more elements, e.g., sensors 408 or actuators 410.

Network-synchronization device 414 may be configured to provide for synchronization between sensors 408 or actuators 410 and one or more other elements of a network (e.g., of the environment 100 of FIG. 1). For example, network-synchronization device 414 may be configured to receive timing frames 484, generate events 485 in response to the timing frames 484, and provide the generated event 485 to one or more of sensors 408 or actuators 410. Additionally, network-synchronization device 414 may be configured to provide outgoing data frames 481 in response to validating timing frames 484, e.g., responsive to a trigger 475 sent from match filter 416 to framer 418 in response to match filter 416 validating timing frame 484. The reception of timing frames 384 and providing of events 485 or outgoing data frames 481 may allow for synchronization between sensors 408 or actuators 310 and the other elements (e.g., of a larger network, or system, e.g., of environment 100 of FIG. 1).

Switch 406 may be an example of switch 206 of FIG. 2. Switch 406 may be configured to provide at least incoming data frames 482 (e.g., from controller 202 of FIG. 2 via network 204 of FIG. 2) and timing frames 484 (e.g., Ethernet frames configured as timing frames) to network-synchronization device 414. Switch 406 may be configured to receive outgoing data frames 481 from network-synchronization device 414 and may be configured to provide outgoing data frames 481 to a controller, e.g., controller 202 of FIG. 2, via network 204 of FIG. 2. Additionally, switch 406 may be configured to provide timing frames 484 at regular intervals to network-synchronization device 414. Additionally, in various examples, switch 406 may be configured to provide timing frames 484 including element information 438 indicative of a specific element (e.g., a sensor or actuator). Additionally, in various examples, switch 406 may be configured to provide timing frames 484 including element information 438 indicative of a specific element (e.g., a sensor or actuator). For example, a first timing frame 484A may include first element information 438A and a second timing frame 484B may include second element information 438B.

Sensors 408 may be an example of sensors 108 of FIG. 1. Actuators 410 may be an example of actuators 110 of FIG. 1.

Switch-facing interface 402 may be an interface of network-synchronization device 414, e.g., an Ethernet port that may be configured to send and receive signals. Switch-facing interface may include a switching fabric (not illustrated) or a classifier (not illustrated). Switch-facing interface 402 may be configured to receive incoming frames (e.g., Ethernet frames), including incoming data frames 482 and timing frames 484 (e.g., from switch 306) and to provide incoming data frames 482 to framer 418 and to provide timing frames 484 to match filter 416. Switch-facing interface 402 may be configured to receive outgoing data frames 481 (e.g., from framer 418) and to provide outgoing data frames 481 to switch 306.

Match filter 416 may be configured to validate timing frames 484. For example, match filter 416 may be configured to receive timing frames 484 from switch-facing interface 402 and to determine whether each of timing frames 484 is a valid timing frame. For example, match filter 416 may include a timing-frame definition 422. Match filter 416 may be configured to compare timing frames 484 to timing-frame definition 422 to determine whether each of timing frames 484 is a valid timing frame. Match filter 416 may include any suitable logic (e.g., a digital filter) configured to determine whether timing frames 484 are valid timing frames. The comparison of timing frames 484 with timing-frame definition 422 may include comparing identifying information 479, e.g., in a header of timing frames 484 with identifying information 477 of timing-frame definition 422. For example, one or more of: a source media access control (MAC) address, a VLAN tag (e.g., according to IEEE 802.1Q), or an EtherType tag of timing frames 484 may be compared with identifying information 477 of timing-frame definition 422. Additionally or alternatively, identifying information 479 as found in one or more bits in a payload of timing frames 484 may be compared with identifying information 477 to determine whether timing frames 484 are valid timing frames. As illustrated, in various non-limiting examples, match filter 416 may operate at link layer 434 of network-synchronization device 414.

Additionally, in various examples, match filter 416 may be configured to provide events 485 to specific elements, e.g., actuators 410 or sensors 408, responsive to element information 438 in the timing frames 484. For example, match filter 416 may be configured to compare element information 438 (e.g., bits in a header or payload) in timing frame 384 with timing-frame definition 422 to determine which of sensors 408 or actuators 410 is indicated by timing frame 484. For example, if match filter 416 determines that a first received timing frame 484A includes first element information 438A indicative of a particular one of actuators 410, match filter 416 may be configured to generate an event 485A for the particular one of actuators 410. And, if match filter 416 determines that a second received timing frame 484B includes second element information 438B indicative of a particular one of sensors 408, match filter 416 may be configured to generate an event 485B for the particular one of sensors 408. Generating an event 485 for a particular element may include, as non-limiting examples, providing the event 485 to the specific element.

Additionally, in various examples, network-synchronization device 414 may be configured to provide outgoing data frames 481 in response to validating the timing frames 484, e.g., responsive to a trigger 475 sent from match filter 416 to framer 418 in response to match filter 416 validating timing frame 484. The reception of the timing frames 484 and providing of the events 485 and/or outgoing data frames 481 may allow for synchronization between sensors 408 or actuators 410 and the other devices or components.

As indicated, switch 406 may be an example of switch 206 of FIG. 2 and may function as described above with regard to FIG. 2 or FIG. 3. As indicated, sensors 408 may be an example of sensors 108 of FIG. 1 and may function as described above with regard to FIG. 1 or FIG. 3. As indicated, actuators 410 may be an example of actuators 110 of FIG. 1 and may function as described above with regard to FIG. 1 or FIG. 3.

Switch-facing interface 402 may be the same as, or substantially similar to, switch-facing interface 302 of FIG. 3 and may function as described above with regard to FIG. 3. Match filter 416 may be the same as, or substantially similar to, match filter 316 of FIG. 3 and may function as described above with regard to FIG. 3. Timing-frame definition 422 may be the same as, or substantially similar to, timing-frame definition 322 of FIG. 3 and may function as described above with regard to FIG. 3. Framer 418 may be the same as, or substantially similar to, framer 318 of FIG. 3 and may function as described above with regard to FIG. 3. Memory 430 may be the same as, or substantially similar to, memory 330 of FIG. 3 and may function as described above with regard to FIG. 3. Event-switching fabric 432 may be the same as, or substantially similar to, event-switching fabric 332 of FIG. 3 and may function as described above with regard to FIG. 3. Bus 442 may be the same as, or substantially similar to, bus 342 of FIG. 3 and may function as described above with regard to FIG. 3. ADC 424 may be the same as, or substantially similar to, ADC 324 of FIG. 3 and may function as described above with regard to FIG. 3 with the exception that ADC 424 may be a part of, or included in, network-synchronization device 414. DAC 426 may be the same as, or substantially similar to, DAC 326 of FIG. 3 and may function as described above with regard to FIG. 3 with the exception that DAC 426 may be a part of, or included in, network-synchronization device 414.

A difference between network-synchronization device 312 of FIG. 3 and network-synchronization device 414 of FIG. 4 is that network-synchronization device 414 includes elements therein, e.g., one or more sensors 408 or actuators 410 whereas network-synchronization device 312 is configured to communicate with one or more external elements, e.g., sensors 308 or actuators 310.

Figure 5:
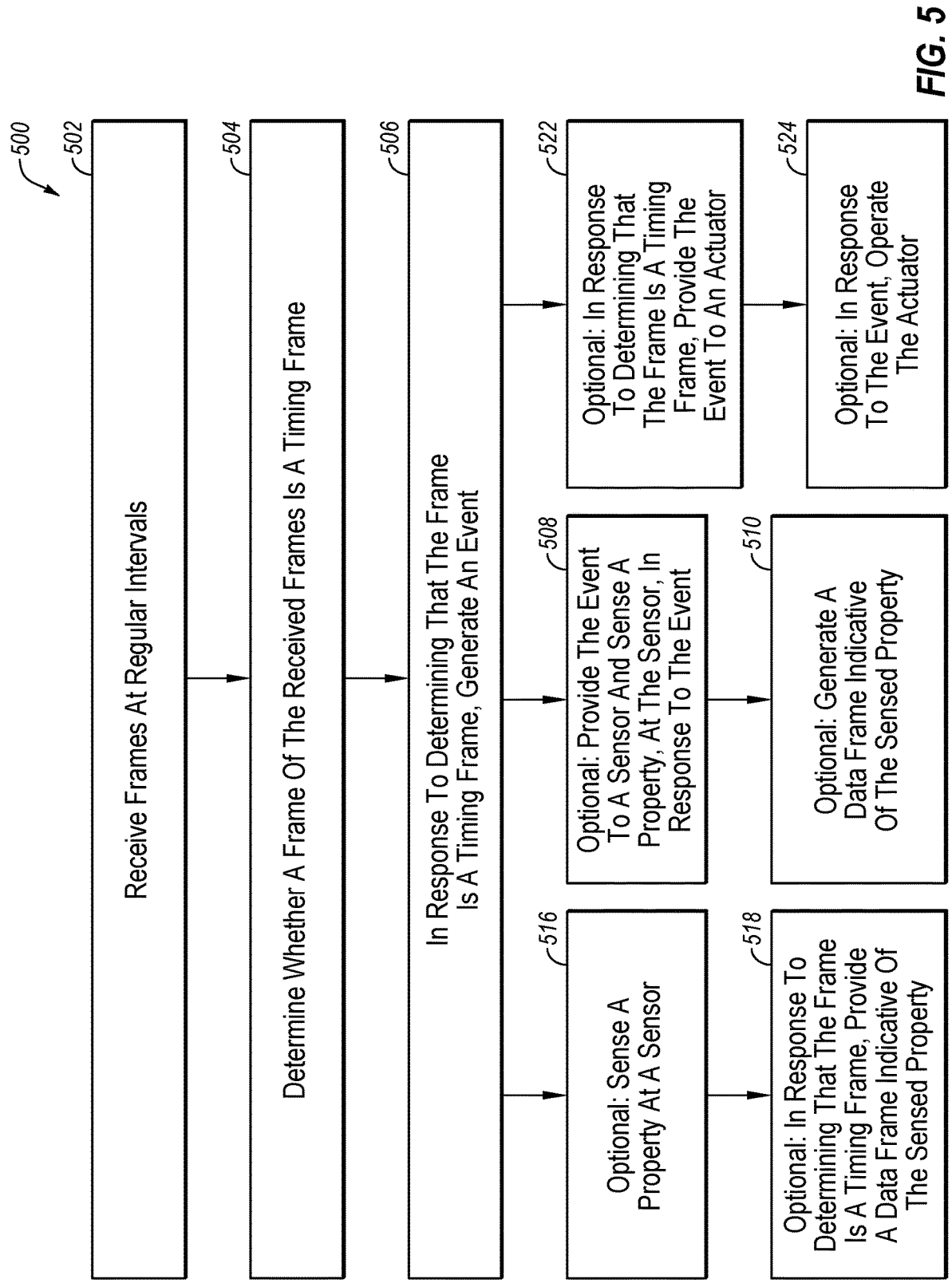
FIG. 5 is a flowchart of an example method of synchronizing operation of an element, according to one or more examples of the present disclosure.

FIG. 5 is a flowchart of an example method 500 of synchronizing operation of an element, according to one or more examples of the present disclosure. One or more of network-synchronization device 112, network-synchronization device 114 of FIG. 1, network-synchronization device 312 of FIG. 3, and network-synchronization device 414 of FIG. 4 may be configured to perform one or more of the operations described herein with regard to method 500.

At block 502, frames (e.g., Ethernet frames) may be received at a port of a device at regular intervals. The frames may include timing frames. The frames may be received from e.g., a switch e.g., switch 206 as described above with regard to FIG. 2. The switch may be configured to generate timing frames at regular intervals.

At block 504, it may be determined whether a frame of the received frames is a timing frame. For example, a comparison may be made between a received frame and a timing-frame definition. The comparison may include comparing at least a portion of a header of the received frame with the timing-frame definition. In various examples, the comparison may be made by a match filter, e.g., match filter 316 of FIG. 3 or match filter 416 of FIG. 4.

At block 506, in response to a determination that the received frame is a timing frame, an event may be generated at the device. In various examples, the event may be generated by the match filter that made the comparison.

At block 508, which is optional, the event may be provided to a sensor and, in response to the event, a property may be sensed at the sensor. At block 510, which is optional, a data frame may be generated, and transmitted (e.g., to a switch, e.g., switch 206 of FIG. 2). The data frame may be indicative of the property sensed at block 508.

At block 516, which is optional, a property may be sensed. At block 518, which is optional, in response to the event (or, in response to the determination that a received frame is a timing frame) a data frame indicative of the sensed property may be provided (e.g., to a switch, e.g., switch 206 of FIG. 2).

At block 522, which is optional, in response to determining that a received frame is a timing frame, the event may be provided to an actuator. The event may cause the actuator to operate (e.g., cause movement). In various examples, the operation may be according to a control signal of a previously-received data frame. For example, the degree of operation of the actuator may be indicated by the event and based on the control signal. In some examples, the control signal may be provided to the actuator prior to the event and the actuator may be configured to not operate until the actuator receives an event.

At block 524, in response to the event, the actuator may be operated e.g., the actuator may cause movement, without limitation.

Figure 6:
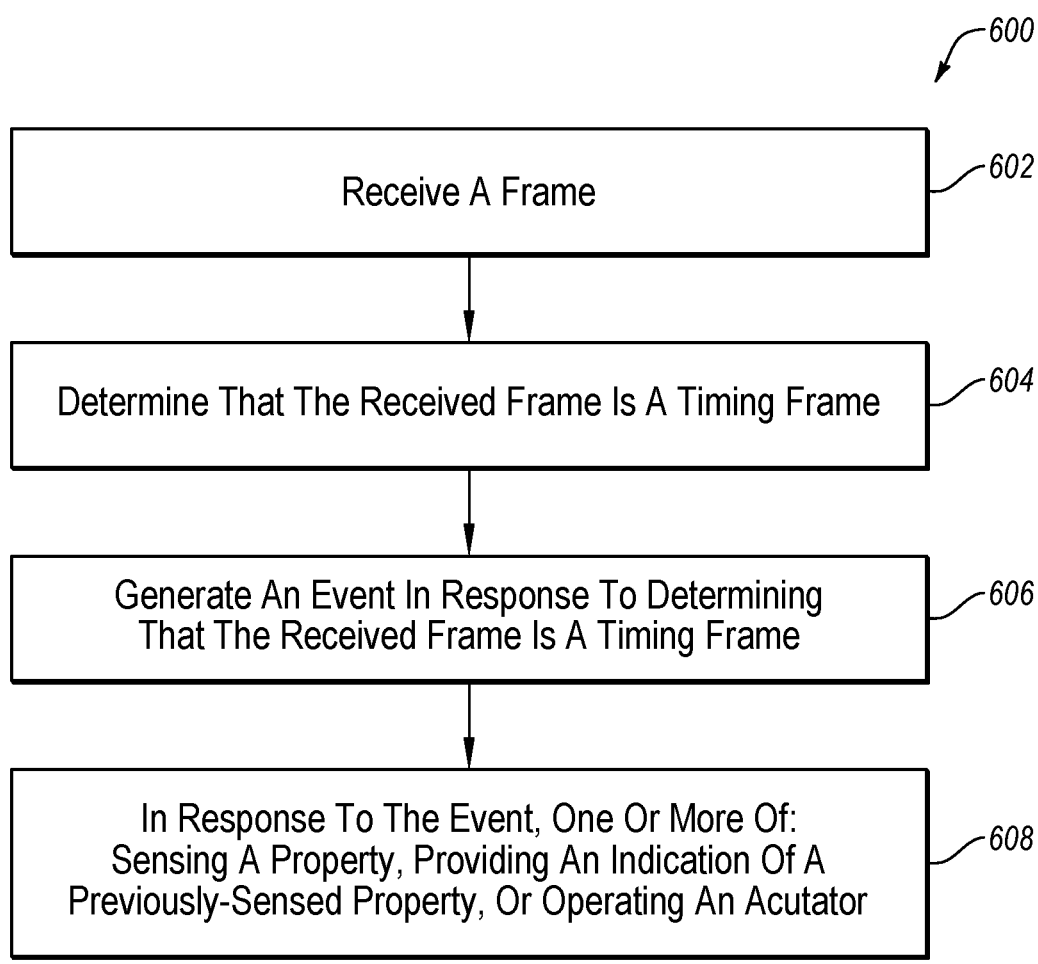
FIG. 6 is a flowchart of another example method of synchronizing operation of an element, according to one or more examples of the present disclosure.

FIG. 6 is a flowchart of an example method 600 of synchronizing operation of an element, according to one or more examples of the present disclosure. One or more of: network-synchronization device 112, network-synchronization device 114 of FIG. 1, network-synchronization device 312 of FIG. 3, and network-synchronization device 414 of FIG. 4 may be configured to perform one or more of the operations described herein with regard to method 600.

At block 602 a frame (e.g., an Ethernet frame) may be received.

At block 604, it may be determined that the received frame is a timing frame. The determination that the received frame is a timing frame may be based on a comparison between at least a portion of the receive frame and a timing-frame definition. For example, at least a portion of the header or payload of the received frame may be compared with at least a portion of the timing-frame definition.

At block 606 an event may be generated in response to the determination that the received frame is a timing frame.

At block 608 in response to the event, one or more of: a property may be sensed, an indication of a previously-sensed property may be provided, or an actuator may be operated.

Figure 7:
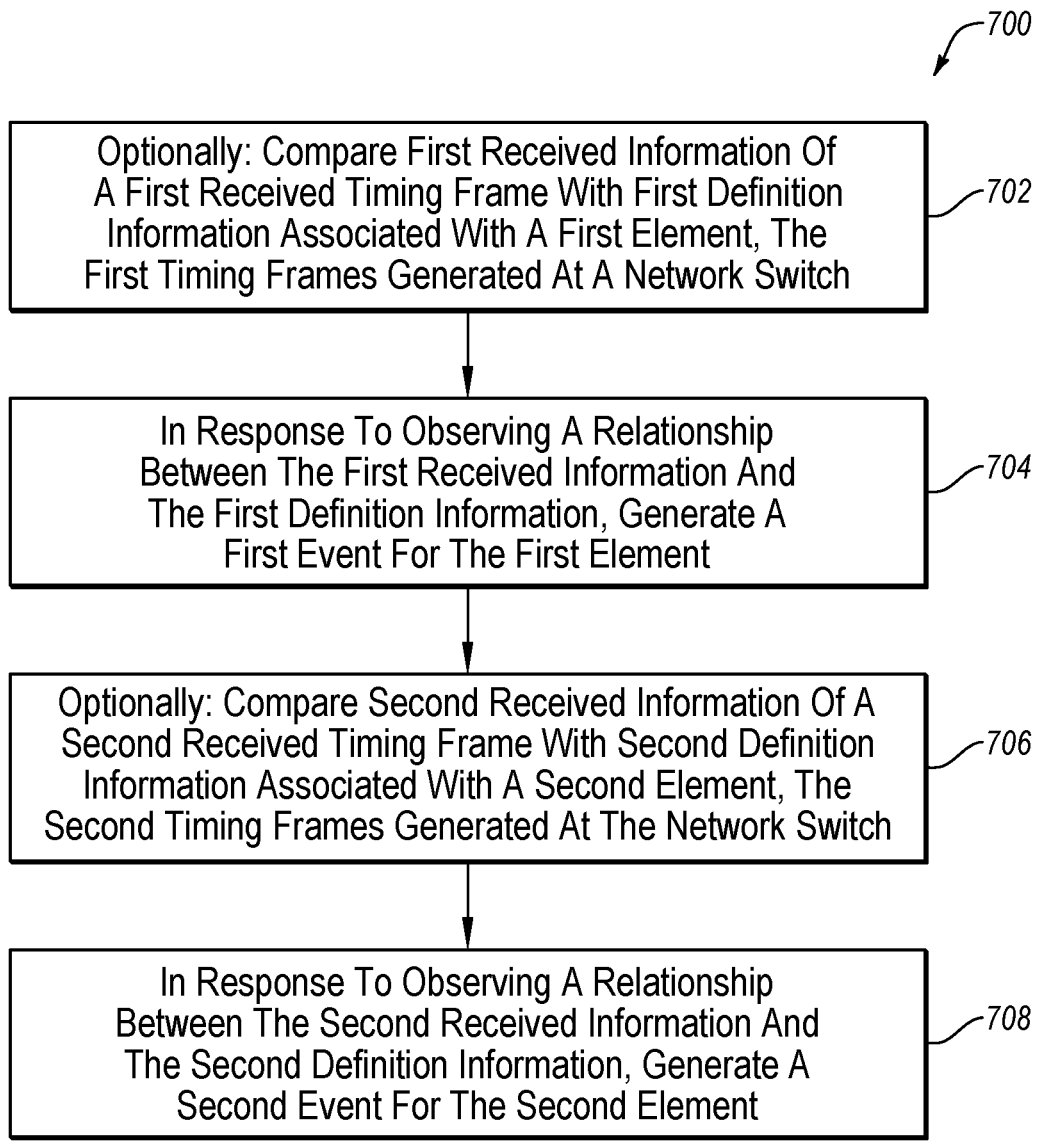
FIG. 7 is a flowchart of an example method for synchronizing operation of elements in a network, according to one or more examples of the present disclosure.

FIG. 7 is a flowchart of an example method for synchronizing operation of elements in a network, according to one or more examples of the present disclosure. One or more of: network-synchronization device 112, network-synchronization device 114 of FIG. 1, network-synchronization device 312 of FIG. 3, and network-synchronization device 414 of FIG. 4 may be configured to perform one or more of the operations described herein with regard to method 700. In particular, in various embodiments, match filter 316 of FIG. 3 or match filter 416 of FIG. 4 may be configured to perform one or more of the operations described herein with regard to method 700.

At block 702, which is optional, first received information of a first received timing frame may be compared with first definition information associated with a first element. The first timing frame may have been generated at a network switch.

At block 704, in response to a relationship between the first received information and the first definition information, a first event may be generated for the first element.

At block 706, which is optional, second received information of a second received timing frame may be compared with second definition information associated with a second element. The second timing frame may have been generated at the network switch.

At block 708, in response to a relationship between the second received information and the second definition information, a second event may be generated for the second element.

Figure 9:
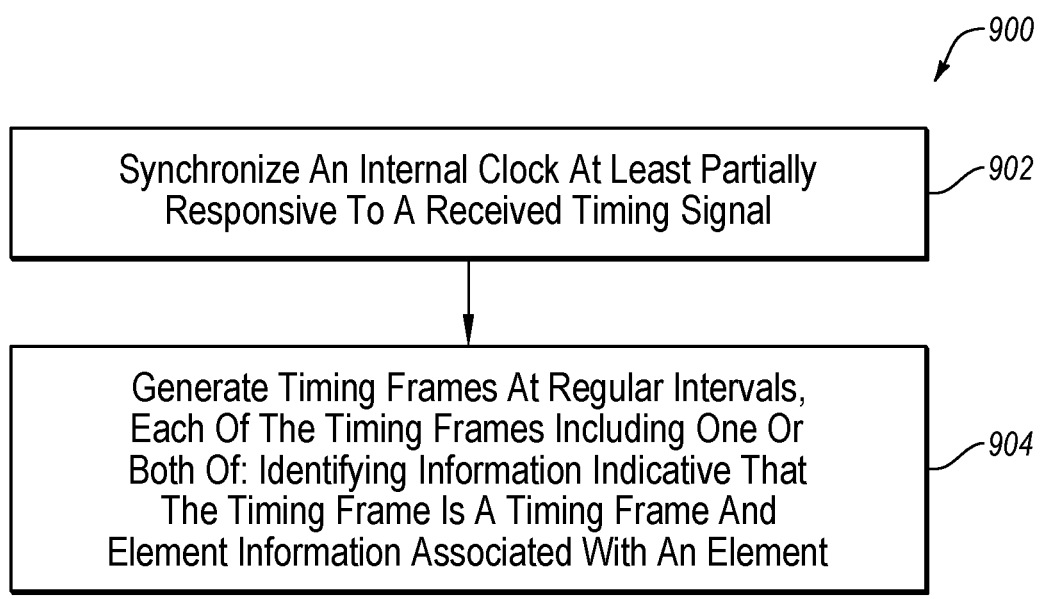
FIG. 9 is a flowchart of an example method for generating timing frames in a network, according to one more examples of the present disclosure.

FIG. 9 is a flowchart of an example method for generating timing frames in a network, according to one or more examples of the present disclosure. One or more of: switch 106 of FIG. 1, switch 206 of FIG. 2, switch 306 of FIG. 3, and switch 406 of FIG. 4 may be configured to perform one or more of the operations described herein with regard to method 900.

At block 902, an internal clock may be synchronized at least partially responsive to a received timing signal.

At block 904, timing frames may be generated at regular intervals. Each of the timing frames may include one or both of: identifying information indicative that the timing frame is a timing frame and element information associated with an element. Identifying information 379 of FIG. 3 and identifying information 379 of FIG. 4 are examples of the identifying information of method 900. Element information 338 of FIG. 3 and element information 438 of FIG. 4 are examples of information associated with an element of method 900.

Figure 10:
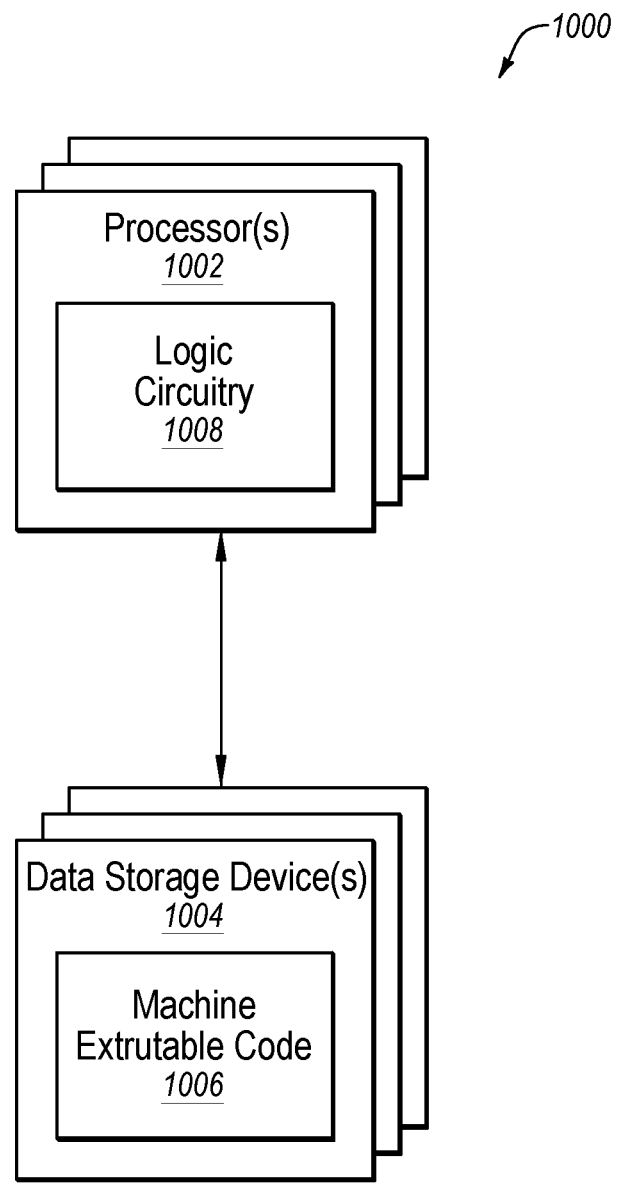
FIG. 10 is a block diagram illustrating an example device that may be used to implement various functions, operation, acts, processes, or methods, in accordance with one or more examples of the present disclosure.

FIG. 10 is a block diagram of an example device 1000 that, in various examples, may be used to implement various functions, operations, acts, processes, or methods disclosed herein. Device 1000 includes one or more processors 1002 (sometimes referred to herein as "processors 1002") operably coupled to one or more apparatuses such as data storage devices (sometimes referred to herein as "storage 1004"), without limitation. Storage 1004 includes machine executable code 1006 stored thereon (e.g., stored on a computer-readable memory) and processors 1002 include logic circuitry 1008. Machine executable code 1006 include information describing functional elements that may be implemented by (e.g., performed by) logic circuitry 1008.

Logic circuitry 1008 is adapted to implement (e.g., perform) the functional elements described by machine executable code 1006. Device 1000, when executing the functional elements described by machine executable code 1006, should be considered as special purpose hardware configured for carrying out functional elements disclosed herein. In various examples, processors 1002 may be configured to perform the functional elements described by machine executable code 1006 sequentially, concurrently (e.g., on one or more different hardware platforms), or in one or more parallel process streams.

When implemented by logic circuitry 1008 of processors 1002, machine executable code 1006 is configured to adapt processors 1002 to perform operations of examples disclosed herein. For example, machine executable code 1006 may be configured to adapt processors 1002 to perform at least a portion or a totality of method 500 of FIG. 5, a portion of a totality of method 600 of FIG. 6, or a portion of a totality of method 700 of FIG. 7. As another example, machine executable code 1006 may be configured to adapt processors 1002 to perform at least a portion or a totality of the operations discussed for system 200 of FIG. 2, and more specifically, the operations discussed with regard to switch 206 of FIG. 2 (e.g., internal clock source 216, frame generator 218, or switching logic 224, without limitation). As another example, machine executable code 1006 may be configured to adapt processors 1002 to perform at least a portion or a totality of the operations discussed for system 300 of FIG. 3, and more specifically, the operations discussed with regard to network-synchronization device 312 of FIG. 3 (e.g., match filter 316, or framer 318, without limitation). As another example, machine executable code 1006 may be configured to adapt processors 1002 to perform at least a portion or a totality of the operations discussed for system 400 of FIG. 4, and more specifically, the operations discussed with regard to network-synchronization device 414 of FIG. 4 (e.g., match filter 416, or framer 418, without limitation).

Processors 1002 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer is configured to execute computing instructions (e.g., software code) related to examples of the present disclosure. It is noted that a general-purpose processor (may also be referred to herein as a host processor or simply a host) may be a microprocessor, but in the alternative, processors 1002 may include any conventional processor, controller, microcontroller, or state machine. Processors 1002 may also be implemented as a combination of computing devices, such as a combination of a DSP and a microprocessor, a plurality of microprocessors, one or more microprocessors in conjunction with a DSP core, or any other such configuration.

In various examples, storage 1004 includes volatile data storage (e.g., random-access memory (RAM)), non-volatile data storage (e.g., Flash memory, a hard disc drive, a solid state drive, erasable programmable read-only memory (EPROM), without limitation). In various examples, processors 1002 and storage 1004 may be implemented into a single device (e.g., a semiconductor device product, a system on chip (SOC), without limitation). In various examples the processors 1002 and the storage 1004 may be implemented into separate devices.

In various examples, machine executable code 1006 may include computer-readable instructions (e.g., software code, firmware code). By way of non-limiting example, the computer-readable instructions may be stored by storage 1004, accessed directly by processors 1002, and executed by processors 1002 using at least logic circuitry 1008. Also by way of non-limiting example, the computer-readable instructions may be stored on storage 1004, transmitted to a memory device (not shown) for execution, and executed by processors 1002 using at least logic circuitry 1008. Accordingly, in various examples logic circuitry 1008 includes electrically configurable logic circuitry.

In various examples, machine executable code 1006 may describe hardware (e.g., circuitry) to be implemented in logic circuitry 1008 to perform the functional elements. This hardware may be described at any of a variety of levels of abstraction, from low-level transistor layouts to high-level description languages. At a high-level of abstraction, a hardware description language (HDL) such as an IEEE Standard hardware description language (HDL) may be used, without limitation. By way of non-limiting examples, Verilog™, SystemVerilog™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of logic circuitry 1008 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in various examples machine executable code 1006 may include an HDL, an RTL, a GL description, a mask level description, other hardware description, or any combination thereof.

In examples where machine executable code 1006 includes a hardware description (at any level of abstraction), a system (not shown, but including storage 1004) may be configured to implement the hardware description described by machine executable code 1006. By way of non-limiting example, processors 1002 may include a programmable logic device (e.g., an FPGA or a PLC) and logic circuitry 1008 may be electrically controlled to implement circuitry corresponding to the hardware description into logic circuitry 1008. Also by way of non-limiting example, logic circuitry 1008 may include hard-wired logic manufactured by a manufacturing system (not shown, but including storage 1004) according to the hardware description of machine executable code 1006.

Regardless of whether machine executable code 1006 includes computer-readable instructions or a hardware description, logic circuitry 1008 is adapted to perform the functional elements described by machine executable code 1006 when implementing the functional elements of machine executable code 1006. It is noted that although a hardware description may not directly describe functional elements, a hardware description indirectly describes functional elements that the hardware elements described by the hardware description are capable of performing.

Any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed there or that the first element must precede the second element in some manner. In addition, unless stated otherwise, a set of elements may comprise one or more elements.

As used herein, the term "substantially" in reference to a given parameter, property, or condition means and includes to a degree that one of ordinary skill in the art would understand that the given parameter, property, or condition is met with a small degree of variance, such as, for example, within acceptable manufacturing tolerances. By way of example, depending on the particular parameter, property, or condition that is substantially met, the parameter, property, or condition may be at least 90% met, at least 95% met, or even at least 99% met.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In various examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1. A network-synchronization device, comprising: a match filter configured to generate events for synchronizing operation of elements of a network at least partially responsive to information included in timing frames generated at a network switch, wherein the events for synchronizing operation of the elements comprise a first event generated at least partially responsive to first information associated with a first element and a second event generated at least partially responsive to second information associated with a second element.

Example 2. The network-synchronization device according to Example 1, wherein the match filter is provided at a link layer of the network-synchronization device.

Example 3. The network-synchronization device according to any of Examples 1 through 2, wherein each of the first element and the second element comprise edge elements communicatively coupled with the network-synchronization device.

Example 4. The network-synchronization device according to any of Examples 1 through 3, comprising the first element and the second element.

Example 5. The network-synchronization device according to any of Examples 1 through 4, wherein at least one of the timing frames includes one or more of the first information and the second information.

Example 6. The network-synchronization device according to any of Examples 1 through 5, wherein the match filter is configured to: generate the first event at least partially responsive to receiving a first timing frame including the first information; and generate the second event at least partially responsive to receiving a second timing frame including the second information.

Example 7. The network-synchronization device according to any of Examples 1 through 6, wherein the match filter further comprises a timing-frame definition including the first information and the second information and the match filter is configured to determine whether the received timing frame includes one or more of the first information and the second information responsive to observing a relationship between the received timing frame and the timing-frame definition.

Example 8. The network-synchronization device according to any of Examples 1 through 7, wherein the first event comprises operational instructions for the first element, and the second event comprises operational instructions for the second element.

Example 9. The network-synchronization device according to any of Examples 1 through 8, wherein each of the timing frames includes identifying information indicative that the timing frame is a timing frame.

Example 10. The network-synchronization device according to Example 9, wherein the match filter is configured to determine whether a received frame is a timing frame at least partially responsive to a presence or absence of the identifying information in the received frame.

Example 11. The network-synchronization device according to any of Examples 1 through 10, comprising a framer configured to generate a data frame indicative of a property sensed by a sensor of the first element.

Example 12. The network-synchronization device according to any of Examples 1 through 11, comprising a framer configured to generate a control signal indicative of an operation to be performed by an actuator of the first element.

Example 13. A system comprising: a network switch configured to generate timing frames; and a network-synchronization device, comprising: a match filter configured to generate events for synchronizing operation of elements of a network at least partially responsive to information included in the timing frames, wherein the events for synchronizing operation of the elements comprise a first event generated at least partially responsive to first information associated with a first element and a second event generated at least partially responsive to second information associated with a second element.

Example 14. The system according to Example 13, wherein the network switch is configured to generate the timing frames to include one or more of the first information and the second information.

Example 15. The system according to any of Examples 13 through 14, wherein the network switch is configured to generate the timing frames at regular intervals.

Example 16. The system according to any of Examples 13 through 15, wherein the network switch is configured to synchronize an internal clock at least partially responsive to a received timing signal.

Example 17. The system according to any of Examples 13 through 16, wherein the network switch is configured to generate each of the timing frames to include identifying information indicative that the timing frame is a timing frame.

Example 18. The system according to Example 17, wherein the identifying information is included in a header of the timing frame.

Example 19. The system according to any of Examples 17 through 18, wherein the timing frames are Ethernet frames and the identifying information is included in each of the Ethernet frames in one or more of: a source-media-access-control address, a virtual-local-area-network tag, or an EtherType tag.

Example 20. The system according to any of Examples 17 through 19, wherein the identifying information is included in a payload of the timing frame.

Example 21. A system comprising: a first element; a second element; and a network-synchronization device, comprising: a match filter configured to generate events for synchronizing operation of elements of a network at least partially responsive to information included in timing frames generated at a network switch, wherein the events for synchronizing operation of the elements comprise a first event generated at least partially responsive to first information associated with the first element and a second event generated at least partially responsive to second information associated with the second element.

Example 22. The system according to Example 21, wherein the first element is a sensor configured to sense a property in response to the first event.

Example 23. The system according to any of Examples 21 through 22, wherein the first element is a sensor configured to provide a reading indicative of a sensed property in response to the first event.

Example 24. The system according to any of Examples 21 through 23, wherein the first element is a sensor configured to sense a property and provide a reading indicative of the sensed property to the network-synchronization device, and the network-synchronization device is configured to generate a data frame based on the reading at least partially responsive to receipt of a timing frame.

Example 25. The system according to any of Examples 21 through 24, wherein the first element is an actuator configured to operate at least partially responsive to the first event.

Example 26. The system according to any of Examples 21 through 25, wherein the first element is an actuator configured to operate according to a previously-received control signal at least partially responsive to the first event.

Example 27. A method for synchronizing operation of elements in a network, the method comprising: comparing first received information of a first received timing frame with first definition information associated with a first element, the first timing frame generated at a network switch; in response to observing a relationship between the first received information and the first definition information, generating a first event for the first element; comparing second received information of a second received timing frame with second definition information associated with a second element, the second timing frame generated at the network switch; and in response to observing a relationship between the second received information and the second definition information, generating a second event for the second element.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. A network-synchronization device, comprising:
a match filter comprising a memory and a processor, the match filter to:
detect valid timing frames at least partially responsive to comparisons of timing-frame definitions with information included in timing frames generated at a network switch;
associate respective elements of a network with respective detected valid timing frames; and
generate events for synchronizing operation of the associated respective elements of the network.

2. The network-synchronization device of claim 1, wherein the match filter is provided at a link layer of the network-synchronization device.

3. The network-synchronization device of claim 1, wherein the associated respective elements of the network comprise edge elements communicatively coupled with the network-synchronization device.

4. The network-synchronization device of claim 1, wherein the network-synchronization device includes the associated respective elements of the network.

5. The network-synchronization device of claim 1, wherein the match filter to:
generate a first of the events at least partially responsive to information included in a first timing frame; and
generate a second of the events at least partially responsive to information included in a second timing frame, the second timing frame different than the first timing frame.

6. The network-synchronization device of claim 1, wherein the timing-frame definitions include information relatable to the information included in timing frames generated at the network switch.

7. The network-synchronization device of claim 1, wherein respective ones of the generated events comprise operational instructions for respective ones of the associated respective elements of the network.

8. The network-synchronization device of claim 1, wherein the information included in timing frames respectively includes an indication of timing frame.

9. The network-synchronization device of claim 8, wherein the match filter to determine whether a received frame is a timing frame at least partially responsive to a presence or absence of the identifying information in the received frame.

10. The network-synchronization device of claim 1, comprising a framer to generate a data frame indicative of a property sensed by a sensor of an element of the respective associated elements of the network.

11. The network-synchronization device of claim 1, comprising a framer to generate a control signal indicative of an operation to be performed by an actuator of an element of the respective associated elements of the network.

12. A system comprising:
a network switch to generate timing frames; and
a network-synchronization device, comprising:
a match filter comprising a memory and a processor, the match filter to:
detect valid timing frames at least partially responsive to comparisons of timing-frame definitions with information included in timing frames generated by the network switch;
associate respective elements of a network with respective detected valid timing frames; and
generate events for synchronizing operation of the associated respective elements of the network.

13. The system of claim 12, wherein the network switch to generate timing frames at regular intervals.

14. The system of claim 12, wherein the network switch to synchronize an internal clock at least partially responsive to a received timing signal.

15. The system of claim 12, wherein the network switch to include an indication of timing frame in respective information included in timing frames.

16. The system of claim 15, wherein the respective identifying information is included in a header of the respective timing frame.

17. The system of claim 15, wherein the timing frames are Ethernet frames and the identifying information is included in one or more of: a source-media-access-control address, a virtual-local-area-network tag, or an EtherType tag.

18. The system of claim 15, wherein the identifying information is included in a payload of the respective timing frame.

19. A system comprising:
a first element;
a second element; and
a network-synchronization device, comprising:
   a match filter comprising a memory and a processor, the match filter to:
   detect valid timing frames at least partially responsive to comparisons of timing-frame definitions with information included in timing frames generated by a network switch;
   associate respective ones of detected valid timing frames with respective ones of the first element or the second element; and
   generate events for synchronizing operation of the associated respective ones of the first element or the second element.

20. The system of claim 19, wherein the first element is a sensor to sense a property at least partially responsive to a respective event of the generated events.

21. The system of claim 19, wherein the first element is a sensor to provide a reading indicative of a sensed property at least partially responsive to a respective event of the generated events.

22. The system of claim 19, wherein the first element is a sensor to sense a property and provide a reading indicative of the sensed property to the network-synchronization device, and the network-synchronization device to generate a data frame based on the reading at least partially responsive to receipt of a valid timing frame.

23. The system of claim 19, wherein the first element is an actuator to operate at least partially responsive to a respective event of the generated events.

24. The system of claim 19, wherein the first element is an actuator to operate according to a previously-received control signal at least partially responsive to a respective event of the generated events.

25. A method, comprising:
detecting valid timing frames at least partially responsive to comparing timing frame definitions with information included in timing frames generated at a network switch;
associating respective elements of a network with respective detected valid timing frames; and
generating events for synchronizing operation of the associated respective elements of the network.

26. A network-synchronization device, comprising:
a match filter configured to
   generate events for synchronizing operation of elements of a network at least partially responsive to information included in timing frames generated at a network switch,
wherein the events for synchronizing operation of the elements comprise a first event generated at least partially responsive to first information associated with a first element and a second event generated at least partially responsive to second information associated with a second element.

* * * * *